United States Patent [19]

Watrous

[11] 4,167,765
[45] Sep. 11, 1979

[54] TRANSDUCER SUSPENSION MOUNT APPARATUS

[75] Inventor: Robert B. Watrous, San Jose, Calif.
[73] Assignee: International Business Machines Corporation, Armonk, N.Y.
[21] Appl. No.: 928,750
[22] Filed: Jul. 27, 1978
[51] Int. Cl.² .................. G11B 5/48; G11B 21/16
[52] U.S. Cl. ................................. 360/103; 360/104
[58] Field of Search ............... 360/103, 102, 104, 130, 360/99, 75, 105, 128

[56] References Cited

U.S. PATENT DOCUMENTS

| | | | |
|---|---|---|---|
| 3,668,668 | 6/1972 | Robitschek | 360/103 |
| 3,931,641 | 1/1976 | Watrous | 360/104 |

OTHER PUBLICATIONS

IBM/TDB vol. 18, No. 11, Apr. 1976, pp. 3813-3814, "Low-Load Beam Suspension for Magnetic Heads" by R. Watrous.

Primary Examiner—John H. Wolff
Attorney, Agent, or Firm—James A. Pershon

[57] ABSTRACT

A magnetic head/arm assembly has a suspension for an air bearing head slider that includes a single piece substantially rectangular flexure with two parallel flexible narrow fingers, a relatively stiff cross leg, and a central finger to which the slider is attached. A combined load beam-spring element is formed from a single piece and is fastened to the flexure so as to engage a load protuberance formed with the central finger. The substantially triangular load beam/spring element has flanges formed along a portion of its length to concentrate the resilient spring action at the opposite end to the flexure while providing a stiffening action along the remaining portion of its length. The stiff cross leg section of the rectangular flexure is crimped to detent the central finger to keep the attached slider parallel while allowing for the load protuberance thickness to the load beam.

14 Claims, 4 Drawing Figures

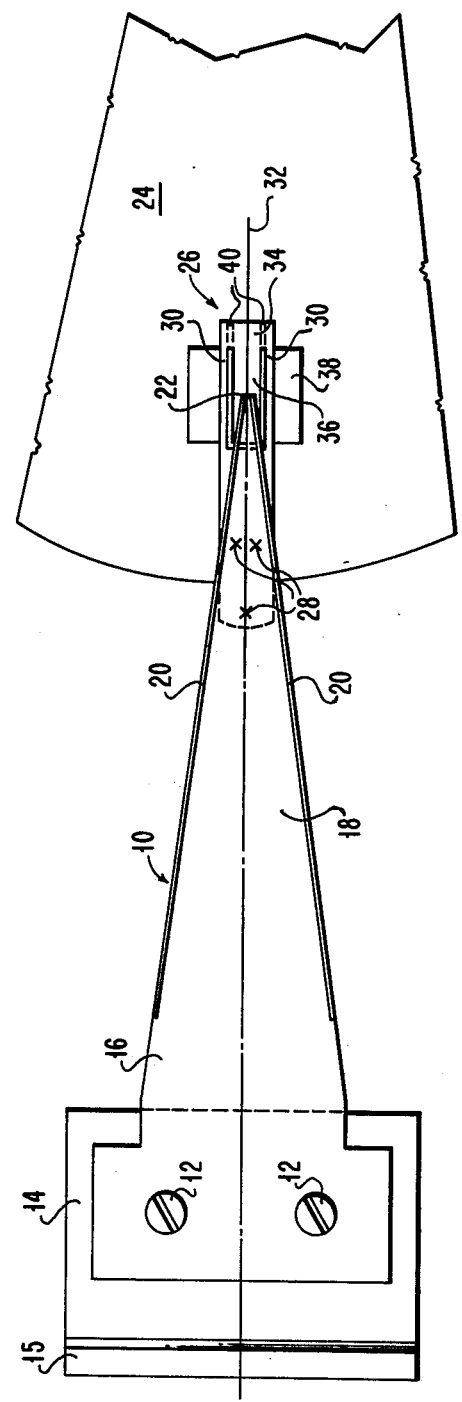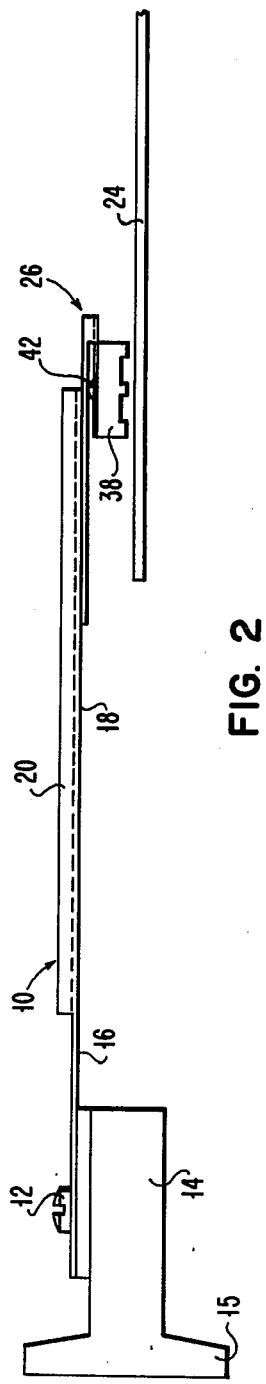

TRANSDUCER SUSPENSION MOUNT APPARATUS

DESCRIPTION

1. Technical Field

This invention relates generally to a magnetic head mounting for dynamic magnetic storage devices, and in particular to a flexible suspension system for an air bearing slider.

In order to have a magnetic transducer closely follow a moving disk surface at a constant spacing in attitude, it is desirable to enable an air bearing head slider and its supporting suspension to pitch around a first axis and to roll about a second axis orthogonal to the first axis. It is also an objective to minimize the effect of radial and circumferential forces that are applied to the head arm and to eliminate a yaw motion. Prior known magnetic head suspensions solve these problems with some degree of success. However, it would be highly advantageous to achieve flexibility of movement for roll and pitch of a magnetic transducer, of the slider to which the transducer is joined and of the flexure or supporting function for the slider in as few a number of separate parts as is possible. These few parts must still provide rigidity against radial, circumferential and yaw motion.

An object of the present invention, therefore, is to provide an enhanced transducer suspension mount apparatus useful for accessing different data tracks of a storage medium.

Another object of this invention is to provide an air bearing flexure slider support system that comprises fewer parts than formerly used in prior art system.

Yet another object is to provide a single piece transducer suspension of the reverse cantilever type wherein the central slider support finger accommodates a load proturberance by virtue of a deformed cross leg at the free end of the suspension. These and other objects of the present invention will become apparent to those skilled in the art as the description proceeds.

2. Background Art

The most pertinent prior art is the U.S. Pat. No. 3,931,641 filed by me and assigned to the assignee of the present invention. In that patent, the slider suspension included a substantially rectangular flexure with two parallel flexible narrow fingers and a relatively stiff cross leg. A central finger to which the slider is attached is separately fastened to a stiff cross leg or is a part of the flexure. The flexure is suspended by a spring member and a load beam. That patent also discloses a single piece spring member and flexure. What is not shown in that patent and what is claimed by the present invention is that the flexure support can be a single spring member piece and that the one-piece flexure can have its stiff cross leg offset to support a slider.

U.S. Pat. No. 3,665,434 discloses a suspension system wherein the access arm adjacent to the flexure is deformed to support the rectangular flexure away from the access arm. The access arm and the flexure are separate pieces fastened together at two points. There is no showing, as will be taught later in the present invention, of a single piece flexure deformed at the area of the reverse cantilever finger to accommodate a level operation of the attached slider while providing a loading protuberance on the flexure.

BRIEF DESCRIPTION OF DRAWINGS

The various novel features of this invention along with the foregoing and other objects, as well as the invention itself both as to its organization and method of operation may be fully understood from the following description of illustrated embodiments when read in conjunction with the accompanying drawing wherein:

FIG. 1 is a top plan view of the magnetic head/arm assembly made in accordance with the present invention;

FIG. 2 is a side view of the assembly as shown in FIG. 1;

DISCLOSURE OF INVENTION

Figure 3:
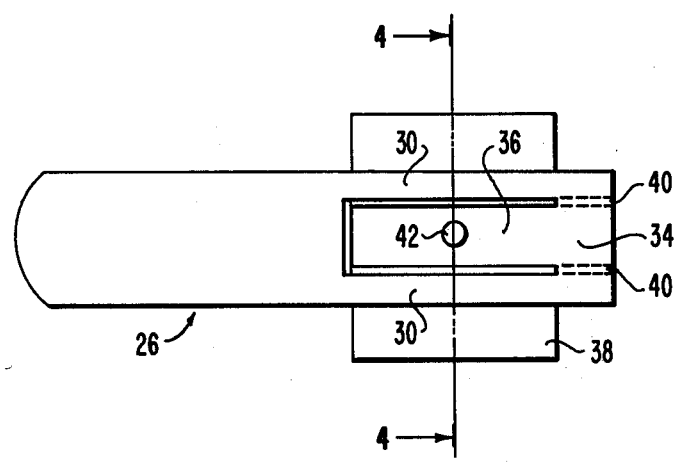
FIG. 3 is an expanded view of the flexure of FIG. 1.

In accordance with this invention, a magnetic head arm assembly comprises a suspension system for an accessing magnetic head assembly which includes a single piece substantially rectangular flexure having two narrow flexible fingers that are disposed parallel to a longitudinal axis defining the accessing path of the head assembly. The flexure includes a relatively stiff cross leg that joins the two flexible fingers at the free end. The cross leg is offset toward the magnetic media leading to a central narrow finger to which the air bearing slider is attached. The offset deformation of the cross leg accommodates a load protuberance disposed on the central narrow finger. A load beam/spring member formed from a single piece is fastened to the flexure and supports the flexure in the accessing position. The load beam/spring member engages the load proturberance to hold the fastened slider in operating position. The single piece load beam/spring structure includes a resilient section for flexibly mounting the transducer suspension mount apparatus and a rigid flanged channel section for engagement to the flexure.

Referring to FIG. 1, a preferred embodiment of a magnetic head/arm assembly made in accordance with the present invention includes a suspension element 10 made of stainless steel, for example, attached by screws 12 or welds, to a rigid arm section 14, which may be made of aluminum. The arm section 14 is joined to a mounting segment 15 which is mounted to an actuator assembly (not shown). The mount segment 15 may include a T-block for carrying a multiplicity of head/-arm assemblies as is normally found in disk file accessing systems.

The element 10 provides a resilient spring section 16 and a triangularly shaped load beam section 18. The triangularly shaped load beam section 18 of the element 10 is provided with flanges 20 as a flat load beam flexure. The apex 22 of the triangular section applies the load beam force used for loading the air bearing magnetic assembly to a moving medium 24 which may be a rotating disk. A flexure 26 is fastened to the element 10 at its load beam section 18 by welds 28, for instance.

The flexure 26 is formed with two narrow flexible outer fingers 30 which run parallel to a longitudinal axis 32 defined by the head/arm assembly. The longitudinal axis 32 generally defines the path of data track accessing followed by the head/arm assembly during the operation of an accessing type disk file. An axis that is orthogonal to and intersects the longitudinal axis delineates the path which is followed by the data track as it traverses the head transducing gap. The two outer flexible fingers 30 lead to a sturdier cross leg 34 substantially parallel to the orthogonal axis. A center tongue 36 between the flexible fingers 30 completes the flexure 26. A slider 38 for carrying a transducer (not shown) is fastened to the center tongue 36 by an epoxy adhesive, for instance, to place the slider 38 and the transducer into a flying air bearing position relative to the disk 24, see FIG. 2. The center tongue 36, which is parallel to and of substantially the same thickness as the two outer flexible fingers 30, supports the air bearing head slider assembly which contains the magnetic transducer and sensing gap. The cross leg 34 is offset from the plane of the flexible fingers 30, thereby placing the plane of the central tongue 36 closer to the disk media 24 as shown in FIG. 2. The offset is shown more clearly in FIGS. 3 and 4 at reference numeral 40 and will be discussed in more detail with those figures. The deformation or offset 40 of the cross leg 34 provides a clearance between the slider 38 and the load beam section 18 so that a roll action will not be inhibited. The offset 40 also places a load button or protuberance 42 of the center tongue 36 in the plane of the flexible fingers 30, see FIG. 2. This minimizes the rubbing action of the load protuberance 42 on the load beam section 18 thereby reducing friction and debris generation. As shown in FIGS. 1 and 2, the apex 22 of the member 10 contacts the load protuberance 42 to apply a loading force to the slider 38 to hold the transducer in operating position close to the disk 24. The slider 38 is preferably fastened to the central tongue 36 such that the load protuberance 42 is located at the center of gravity of the slider. The load beam section 18, which is the triangular portion of the member 10 with the turned upside flanges 20, transmits the load force to urge the slider 38 towards the disk and also transmits this force to the center of gravity of the slider 38 by virtue of the load protuberance 42. The load protuberance 42 may be created by forming a dimple in the center tongue 36 of the flexure 26.

One feature of this invention is that the center tongue 36 which supports the slider assembly 38, is pivotable about the two axes which intersect at the load contact point between the apex 22 of the assembly 10 and the load protuberance 42. The offset 40 of the cross leg 34 permits the use of a single piece flexure 26 allowing a clearance between the assembly 10 and the slider 38 to allow the contact point between the load beam section 18 and the load protuberance 42 to serve as a pivot point about which the slider 38 may pitch and roll in order to follow the changing topography of the disk 24. The pivot point is located on the central tongue 36 centrally to the flexure geometry. The use of the central tongue 36 with a free end in a reverse cantilever structure allows the slider assembly 38 to respond to changes in the air bearing rapidly and with little resistance.

Figure 4:
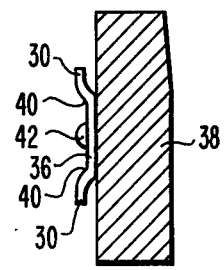
FIG. 4 is a sectional view taken along lines 4—4 of FIG. 3.

The flexure 26 and its supported slider 38 is shown in more detail in FIGS. 3 and 4. In these figures, the single piece flexure 26 construction with the two flexible fingers 30, the cross leg 34 and the central tongue 36 are shown in better detail. The offset 40 of the central tongue 36 from the plane of the flexible fingers 30 is shown in better detail in these figures, especially FIG. 4. The slider 38 is fastened to one side of the central tongue 36 and the load protuberance 42 is located on the other side toward the load applying force of the suspension element 10 (not shown in these figures). The preferred offset distance for the present invention is that the top of the load protuberance 42 will be located on the same plane as the top of the two outer flexible fingers 30. This preferred dimension permits the load beam section 18 of the element 10 and the apex 22 to be on an equal plane with the top of the flexure 26 and the load protuberance 42 such that the load beam section 18 can apply a force to the load protuberance 42 without any further deformation of the apex 22 of the element 10.

With the configuration disclosed, the entire head suspension system comprising the single piece suspension element 10 and flexure 26 does not experience bending forces from the accessing movement. The head suspension system is rigid and resistant to radial, circumferential and yaw motion, and to deflections as referenced to the longitudinal axes that passes through the load beam and the protuberance, as well as to the intersecting orthogonal axis that also passes through the load protuberance. The balance configuration, particularly that of the flexure 26 which has flexible fingers 30 stradling the centrally located finger or tongue 36 and the slider 38 ensures that the assembly responds accurately and quickly to variations in air bearing so that the transducing gap constantly maintains a fixed spacing and orientation relative to the changing topography of the surface of the storage medium.

The advantages of the transducer suspension system of the present invention is that a lesser number of parts are required. No separate rigid load beam is required to stiffen the resilient section 16. The rigidness required for the load beam section 18 is included in the assembly 10 by the turned-up side flanges 20 of the triangular load beam section 18. The resilient section 16 of the element 10 serves as a flexible support for the slider while the load beam section 18 provides a rigid section as a load beam. A further advantage is that the slider flexure suspension 26 is also a single piece unit thereby lowering the alignment and fastening steps formerly required with prior art transducing suspension system. The offset required for the freedom of movement of the slider 38 and to accommodate the load protuberance 42, is by virtue of a crimped cross leg 34 rather than the prior art devices which required an offset load beam structure or a separate slider plate that is offset to accommodate the load protuberance and the freedom of action of the slider in an air bearing operation.

The principles of the present invention have now been made clear in an illustrative embodiment. There will be immediately obvious to those skilled in the art many modifications of structure, arrangement, proportion, the element, materials, and components used in the practice of the invention. For instance, the load protuberance 42 may be of any shape other than the spherical shape shown. Likewise, the load protuberance can be located on the end of the apex 22 of the load beam section 18 since it is evident that the only essential portion is to have the load beam, the coupling means, which is the load protuberance, and the central tongue for connection to the slider. The appended claims are, therefore, intended to cover and embrace any such modification, within the limits only of the true spirit and scope of the invention.

Having thus described my invention, what I claim as new, and desire to secure by Letters Patent is:

1. A magnetic head assembly comprising:
   a rigid arm section;
   a single piece spring/load beam element joined to said arm section, said element being substantially resilient adjacent to said rigid arm section and substantially rigid for its remaining length to present a loading force at its free end; and a single piece rectangular type flexure of uniform thickness fastened to said element adjacent to its free end, said flexure having two outer flexible fingers parallel to an axis longitudinal to the assembly, joined at their ends by a relatively wider cross leg having a portion of its length in a plane that is offset from a plane formed by said two outer flexible fingers, and a central tongue extending from said offset portion of said cross leg with a free end centrally located and parallel to said two outer flexible fingers, said central tongue having a load protuberance that contacts the free end of said element wherein said central tongue is offset a distance from said flexible fingers such that the height of said load protuberance is substantially equal to the amount of the offset for achieving flexibility of roll and pitch moment through said central tongue and said flexible fingers is a plane different from the plane formed by said element or said flexible fingers, thereby minimizing friction and debris generation.

2. A magnetic head assembly as defined by claim 1 further including an air bearing slider mounted to said central tongue.

3. A magnetic head assembly as defined by claim 2 wherein said load protuberance is located on the longitudinal axis of the assembly, and on an intersecting axis perpendicular to the longitudinal axis and bisecting said flexure so that said slider may pitch and roll about said axes in response to changes in an air bearing applied to said slider.

4. A magnetic head assembly as defined in claim 3 wherein said protuberance is located at the center of gravity of said slider.

5. A magnetic head assembly as defined by claim 1 wherein said load protuberance is formed by providing a dimple in said central tongue.

6. A magnetic head assembly as defined in claim 1 wherein said spring/load beam element is substantially triangular with an apex of said triangle contacting said load protuberance of said central tongue to provide a loading force.

7. A magnetic head assembly as defined in claim 1 wherein said single piece spring/load beam element includes a flanged channel forming the substantially rigid section.

8. Apparatus for supporting a transducer comprising:
a flexure of uniform thickness having a rectangular cut-out forming two outer flexible fingers extending in the same plane and joined at one of their ends by a less flexible cross leg having a portion of its length in a plane that is offset from the plane formed by said two outer flexible fingers, with a flexible central tongue extending from said offset portion of said cross leg into the rectangular cut-out;

a spring/load beam element supporting said flexure element;

a load protuberance positioned between said load beam and central tongue wherein said central tongue is offset a distance from said flexible fingers such that the height of said load protuberance is substantially equal to the amount of the offset for achieving flexiblity of roll and pitch moment through said central tongue and said flexible fingers in a plane different from the plane formed by said element or said flexible fingers, thereby minimizing friction and debris generation.

9. Apparatus as defined by claim 8 further including an air bearing slider mounted to said central tongue.

10. Apparatus as defined by claim 9 wherein said load protuberance is located on the longitudinal axis of the assembly, and on an intersecting axis perpendicular to the longitudinal axis and bisecting said flexure so that said slider may pitch and roll about said axes in response to changes in an air bearing applied to said slider.

11. Apparatus as defined by claim 9 wherein said protuberance is located at the center of gravity of said slider.

12. Apparatus as defined by claim 8 wherein said load protuberance is formed by providing a dimple in said central tongue.

13. Apparatus as defined by claim 8 wherein said spring/load beam element includes a flanged channel forming the substantially rigid section.

14. A suspension assembly for a transducer comprising:
a rigid arm section;

a single piece substantially triangular spring/load beam element joined to said arm section said element being substantially resilient adjacent to said rigid arm section and including a substantially rigid flanged channel section for its remaining length to present a loading force at its free end apex;

a single piece rectangular type flexure of uniform thickness fastened to said element adjacent to its free end, said flexure having two outer flexible fingers parallel to an axis longitudinal to the assembly and joined at their ends by a relatively wider cross leg having a portion of its length in a plane formed by said two outer flexible fingers, and a central tongue extending from said offset portion of said cross leg with a free end centrally located and parallel to said two outer flexible fingers, said central tongue having a dimpled load protuberance that contacts the apex of said element; and an air bearing slider mounted to said central tongue;

wherein said load protuberance is located on the longitudinal axis of the assembly, and on an intersecting axis perpendicular to the longitudinal axis and bisecting said flexure so that said slider may pitch and roll about said axes in response to changes in an air bearing applied to said slider and wherein said central tongue is offset a distance from said flexible fingers such that the height of said load protuberance is substantially equal to the amount of the offset for achieving flexiblity of roll and pitch moment through said central tongue and said flexible fingers in a plane different from the plane formed by said element or said flexible fingers, thereby minimizing friction and debris generation.

* * * * *